United States Patent

[11] 3,621,401

[72] Inventor Walter J. Young, Jr.
Tonawanda, N.Y.
[21] Appl. No. 860,290
[22] Filed Sept. 23, 1969
[45] Patented Nov. 16, 1971
[73] Assignee Sierra Research Corporation

[54] FREQUENCY SPECTRUM RESPONSIVE NOISE REDUCTION SYSTEM
7 Claims, 5 Drawing Figs.

[52] U.S. Cl. ........................................ 325/473, 325/323, 325/474, 325/477, 325/478, 325/479
[51] Int. Cl. ........................................ H04b 1/10
[50] Field of Search ........................................ 325/322, 324, 371, 379, 474, 477, 478, 479, 480, 323, 473

[56] References Cited

UNITED STATES PATENTS 3,019,335 1/1962 Brilliant ........................ 325/477
3,049,710 8/1962 Buesing et al ................ 325/478
3,126,449 3/1964 Shirman ........................ 325/477
3,213,372 10/1965 Kurvits ........................ 325/478

*Primary Examiner*—Robert L. Griffin
*Assistant Examiner*—Albert J. Mayer
*Attorney*—Alexander & Dowell

ABSTRACT: A system for accepting signals of a desired frequency as well as undesired signals of other frequencies together therewith, separately examining the desired and undesired frequency components to determine their respective intensities and using the results of both determinations to control gating means in the main signal transferring path to pass signals whenever the respective levels of both the desired and the undesired signal components simultaneously fall within satisfactory ranges. These determination are made by regulating a composite of both signal components to a constant level, separating out both components, and then comparing the levels of each with preadjusted reference threshold levels to derive two simultaneous gate controlling signals.

Figure 1:
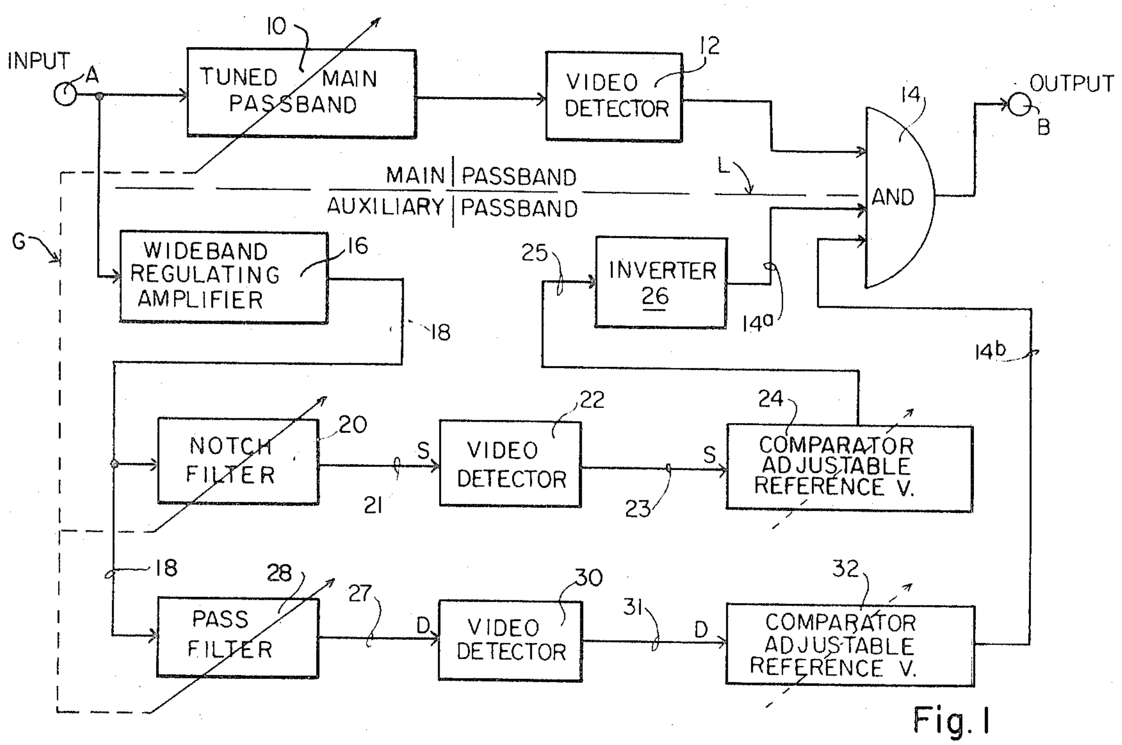

INVENTORS
WALTER J. YOUNG, JR.
PAUL R. EDLICH
LEWIS MICHNIK
BY Alexander & Dowell
ATTORNEYS.

FREQUENCY SPECTRUM RESPONSIVE NOISE REDUCTION SYSTEM

THE INVENTION

The present invention is a noise reduction system which provides a way of increasing selectivity in a tuned signal transferring system to an extent that cannot be accomplished solely by filtering a spectrum of frequencies, and has utility when combined with a great variety of different types of signal transferring systems, such as receivers, not only of RF and IF energy but also of sonic and supersonic energy, for instance in connection with radar and sonar systems. The present invention can be applied to both fixed-tuned and variably tuned signal transferring circuits, as well as to other general types.

A frequent type of interference is caused by transmitting equipment operating in relatively close proximity, and involves a spectrum of undesired signals the center of which (if any) is usually, or can be deliberately, offset somewhat from the center of the main passband of the equipment including the signal transferring system under discussion. The present type of noise elimination is based upon the fact that, in the usual case the frequency spectrum of the desired on-frequency signals will be centered about the system's main passband, but that the spectrum of undesired off-frequency signals will be offset therefrom. Probably the most damaging interference results from radiation arriving directly (as distinguished from reflected energy) from another unit, such as radar or sonar, operating at a slightly different frequency but in close enough proximity to the present system that the selectivity of the latter is incapable of eliminating its interfering signal. Moreover, it is well known that the output pulse energy from a transmitter, for example a magnetron, comprises a spectrum rather than a single output frequency. In other words, the principal-energy pulse delivered from the magnetron is delivered at a nominal frequency, but that magnetron "splash" creates a whole spectrum of other frequencies which amount to a relatively uniformly distributed continuous spectrum extending both up and down from the principal pulse frequency. This "splash" is a substantial source of interference in radar systems and cannot be tuned out because it substantially covers the band, and therefore the only way to avoid interference by other radar has been to remove them from geographic proximity so that distance will attenuate the undesired frequency spectra. This is not a practical solution to a problem which exists among plural radar in a single task force, all of which radar must be allowed to operate simultaneously and in such close proximity with other radar as to frequently cause serious mutual interference.

It is a principal object of this invention to provide improved circuitry for analyzing the spectrum of frequencies introduced into the system both within, and outside of its desired passband, such analysis being performed in an auxiliary passband to the extent of determining the instantaneous level of off-frequency components lying outside the desired passband and also the instantaneous level of on-frequency components inside the desired passband, and then simultaneously using the results of these determinations to decide whether the main passband should at that instant be gated on or gated off. The present system has particular utility in connection with pulse systems in which undesired pulse signals falling outside of the desired passband are eliminated by main-passband gating means controlled by circuitry in the system's auxiliary passband.

This invention includes means in the auxiliary passband for regulating the composite signals comprising the desired and undesired components to a constant level, one example of such regulating means taking the form of an AGC amplifier, and another example taking the form of a high-gain amplifier having a large number of stages some of which will become saturated by the present of desired and/or undesired pulse signals introduced thereinto. Whatever the form of the regulating amplifier, it produces an output having a substantially constant level for input signals lying within a wide range of frequencies and amplitude levels. This regulating amplifier is used in the present system to drive two filter means for separating out into two different comparison channels in the auxiliary passband said components of the composite regulated signals. These components are individually compared as to their momentary levels with adjustable and preset threshold levels in the respective comparison channels. Each such component either exceeds a threshold or lies below it, i.e., the desired component is either greater or less than its channel's threshold level, and the undesired component is either greater or less than its channel's threshold level. Gate means coupling the main passband to the output of the system is under control of both of these criteria. Whenever the desired component exceeds its channel's threshold level and the undesired component is less than its threshold level, the gate means is rendered conductive, but during instants when either or both of these criteria is otherwise, the gate means is blocked and the system has no output.

The two filters in the respective comparison channels, which are driven by the composite regulated signal from the auxiliary passband amplifier, respectively comprise a notch filter for eliminating the on-frequency components and passing the undesired components, and a tuned pass filter for passing the on-frequency components while substantially eliminating the off-frequency components. In an ideal case, the output of the notch filter would include only the off-frequency components of the regulated composite signal, and the output of the pass filter would include only the on-frequency components of the regulated composite signal and no other. However, no filter is perfect and therefore the characteristic pass and rejection curves of both filters will have defects in them, which defects are either very expensive, or perhaps even impossible, to eliminate in practical circuitry.

It is a major object of this invention to provide an improved system in which both a pass filter output and a notch filter output must simultaneously "vote" to pass the signal instantaneously appearing in the main passband, or else this signal will be blocked from the system's output. This system can therefore safely tolerate filter characteristics having reasonable defects, provided however, that the defects occur at different frequencies in the overall spectrum to which the system can respond. Herein lies the advantage over prior art systems using only one filter in the auxiliary passband. If only a notch filter is used, but its rejection characteristic droops at one or both ends of the spectrum of signals arriving at the input of the overall system, then spurious noise signals falling within the drooping portion of the filter characteristic will fail to gate the system "off." Conversely, if the auxiliary passband includes only a tuned pass filter for example having subresonance peaks. Then spurious frequencies falling within these peaks will undesirably gate the system "on." In the present system using both types of filters these undesirable actions will not occur if the filters' defects are staggered within the useful frequency range.

Another object of the invention is to provide a system having separately adjustable threshold levels for each of the comparison channels in the auxiliary passband, such adjustments providing means for determining relative levels at which the system will reject all signal components because of the presence of excessive undesirable off-frequency components or the absence of adequate on-frequency components.

The present system has particular utility in pulse-echo receivers. It can be used either in the IF system of an heterodyne receiver, in which case the main passband and the auxiliary passband filters will be fixed tuned with respect to the intermediate frequency, or else the invention can be used in the R.F. stage of either an heterodyne receiver or a TRF receiver, or in the AF frequency front-end of a sonar receiver. When used in a tunable system of one of the above types rather than in the latter's IF amplifier, then both the main passband and the auxiliary passband filters must be tuned and must track each other. Such tuning may be variously accomplished either by mechanical means or by electronic tuning, for instance voltage-controlled tuning using a scan voltage generator.

Examples of the prior art include Chisholm U.S. Pat. No. 3,218,556, Michnik et al. copending application Ser. No. 603,865, filed Dec. 22, 1966, now abandoned, and related applications all owned by the assignee of this disclosure and designed for the accomplishment of similar purposes.

Other objects and advantages of the invention will become apparent during the following discussion of the drawings, wherein:

FIG. 1 is a block diagram showing a signal transferring system embodying the improved novel features of this invention;

FIGS. 2, 3, 4, and 5 are related graphic diagrams respectively representing the respective passband characteristics of the main passband, the notch filter, the pass filter, and the overall pass characteristic of the system.

Referring now to the drawings, FIG. 1 shows one illustrative embodiment of a signal transferring system of the present type having an input terminal A and an output terminal B, and having a main passband amplifier 10 preferably tuned to pass the desired on-frequency components of the signal introduced at the input terminal A. The output of the main passband amplifier 10, in the present illustrative case of an RF system or an IF system is coupled to a video detector 12 whose output is in turn delivered to gating means 14 interposed between the video detector 12 and the output terminal B, which is a practical system would be connected to some utilization means such as a display unit. The gating means 14 comprises in this illustrative embodiment an AND gate having two control inputs 14*a* and 14*b*, both of which must be enabled before the gating means 14 will conduct video to the output terminal B. There are, of course, many other types of gating means useable in this organization.

The present invention adds to these above mentioned components the additional components appearing beneath the line L in FIG. 1 and located in the auxiliary passband, the illustrated embodiment including a wide band regulating amplifier 16 whose output on wire 18 is regulated to a constant composite signal level, assuming that the input amplitude to the wideband amplifier 16 is sufficient to cause limiting. In practice, this amplifier is a commercially available transistorized unit which is purchased on the open market.

The output of the regulating amplifier 16 on the wire 18 is coupled to two comparison channels, one channel including a notch filter 20 a video detector 22, a comparator 24 and an inverter 26, and the other comparison channel including a band pass filter 28, a video detector 30 and a comparator 32. At any particular instant the regulated signal which appears on wire 18 may or may not include both components which can be classified as spurious components S as well as components which can be classified as desired frequency components D.

The notch filter 20 is tuned to reject the desired frequency components, if any, so that the components appearing on wire 21 are spurious components S. These components are detected by the detector 22 and after detection are delivered on the wire 23 to the adjustable voltage reference level comparator 24. This comparator has an adjustable DC level against which the peak level of the video appearing on wire 23 is constantly checked. As long as the instantaneous video level attributable to spurious components S is less than the adjusted reference level, there is a nonenabling output on wire 25, and this causes the inverter 26 to provide an enabling output on the wire 14*a* thereby rendering one control input to the gate 14 conductive. However, every time a spurious component S appears on the wire 23 which exceeds the level in the comparator 24, an output appears on wire 25 as a result of the fact that the video peak level has exceeded the DC reference threshold in the comparator 24, and the output on wire 25 when inverted by the inverter 26 removes from the wire 14*a* its enabling signal, thereby blocking the gate 14 to prevent the spurious components then present in the system from reaching its output terminal B. Thus, whenever video spurious signals exceed a permissible amplitude, all output is blocked to terminal B.

The other comparison channel works in the opposite manner. Instead of using a notch filter 20 to take out desired components this channel includes a pass filter 28 which is tuned to pass the desired frequency components D to the wire 27 while rejecting spurious components appearing in the output of the regulating amplifier on wire 18. Thus, the input to the video detector 30 includes mainly desired components and no significant undesired component. This is also true of the output on wire 31 from the video detector which comprises mainly desired frequency components D. The comparator 32 also includes an adjustable DC reference level against which the peak amplitude of the desired video component is continuously compared. Whenever enough desired-frequency signal is present on the wire 31 to exceed the comparator threshold level, an output is delivered on wire 14*b* to the AND-gate 14 thereby enabling the lower input to this gate. On the other hand, if the desired-frequency signal dwindles until its level is below the adjusted threshold of the comparator 32, the enabling signal disappears from the wire 14*b* with the result that the AND-gate 14 becomes blocked.

By way of summary, conditions are considered favorable and the gate 14 is conductive whenever the spurious level S is beneath the threshold level in the comparator 24 and simultaneously the desired signal level D on wire 31 exceeds the threshold level in comparator 32, meaning very little spurious signal and satisfactory desired signal. Conversely, conditions are considered unfavorable and the output to the terminal B is blocked whenever the spurious signal level appearing on wire 23 exceeds the threshold in the comparator 24, or whenever the desired signal on wire 31 is less than the threshold level in the comparator 32, or both.

Figures 2, 3, 4, 5:
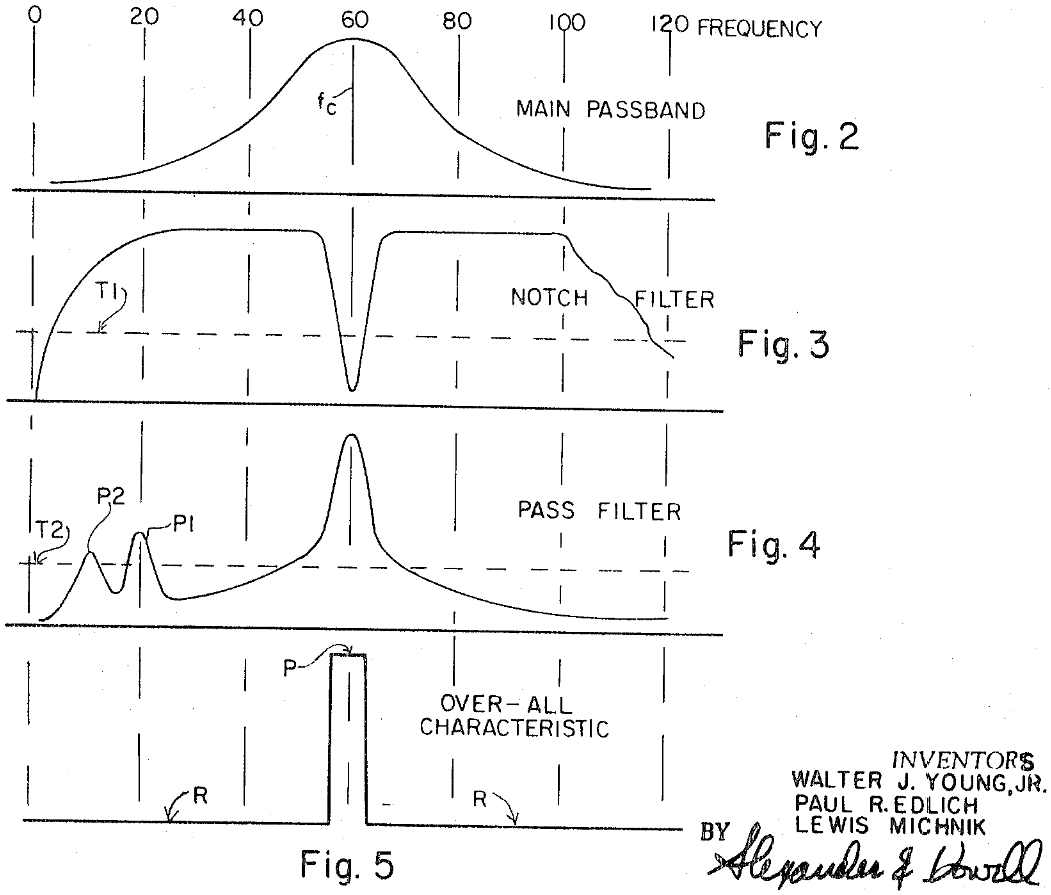

FIGS. 2, 3, 4 and 5 show four related curves in which the first curve of FIG. 2 shows the desired passband tuned to pass the center frequency $f_c$, the second curve of FIG. 3 shows a typical pass characteristic of a notch filter indicating that the filter is substantially nonconductive at the center frequency $f_c$ but also that a practical filter circuit becomes undesirably nonconductive at rather high frequencies and also at rather low frequencies with respect to the MHz scale shown above the four figures. Thus, this is not a perfect filter because it has defects appearing both above and below the notch frequency. FIG. 4 shows the band-pass characteristic of a typical filter 28 in which the filter has good high frequency rejection, but in which it also has several subresonances which appear to be spurious pass frequencies. The horizontal dashed lines on FIGS. 3 and 4, respectively labeled T1 and T2, are threshold levels which are adjustable within and arbitrarily selected by the comparator units 24 and 32. When the notch filter as shown in FIG. 3 is used alone, it provides protection at the center frequency $f_c$ but it also tends to undesirably reject spurious components appearing at points which are both high and low on the frequency spectrum range. Therefore, noise occurring either high or low in the range of frequencies appearing on the wire 18 at the output of the wide band regulating amplifier will be erroneously rejected by the notch filter 20 and will therefore fail to turn off the AND-gate 14, whereby these frequencies would be allowed to leak through if only this one comparison channel were used in the system. Conversely, if only the pass filter comparison channel were used and if one of the spurious peaks P1 or P2, FIG. 4, happened to correspond with a spurious frequency introduced into the present system, the result would be that the pass filter 28 would conduct this spurious frequency as though it were a desired frequency and would erroneously turn on the lower input 14*b* to the AND-gate 14 because the peak of this signal when detected on the wire 31 would exceed the adjusted comparator 32 reference level.

Hence, considered individually, both the notch filter 20 and the pass filter 28 will, under certain spurious frequency conditions individually fail to provide the desired protection, namely the cutting off of the AND-gate 14. However, it will be noted that the spurious peaks P1 and P2 have been deliberately selected and placed in the practical pass filter 28 so that they do not coincide with the areas of no protection appearing at the lower and higher ends of the characteristic of the notch filter 20 as shown in FIG. 3. Therefore, the composite protection characteristic as shown in FIG. 5 is operative to pass only the desired center frequency $f_c$ and this characteristic is of virtually rectangular shape having a central peak P and having full rejection in the areas R for any signal appearing outside of the narrow band of peak frequencies which the system should pass.

In view of the fact that both of the threshold levels T1 and T2 are individually adjustable in the comparators 24 and 32, the system is capable of easy preadjustment to pass any ratio of desired to undesired components from the point of view of their amplitudes. Moreover, because of the rectangular shape of the pass characteristic P shown in FIG. 5, the system can be used to pass only desired frequencies in the presence of noise which extends over an extremely broad overall frequency spectrum. Moreover, the adjustment of comparison levels T1 and T2 also affects the bandwidth of P (FIG. 5) as well as the minimum useable signal. This is one reason why it is not always possible by adjusting T2 alone to eliminate P1 and/or P2, especially when allowance is made for drift with time and temperature.

The present system when used in a fixed-tuned amplifier, such as the IF amplifier of a receiver can be tuned and forgotten in view of the fact that the center IF frequency $f_c$ remains constant. The main passband frequency $f_c$ lies within the pass characteristic of the tuned amplifier 10, within the rejection notch of the filter 20, and within the main peak of the filter 28, and these all have to be tuned to the IF frequency $f_c$. On the other hand, if the present system is used in a tuneable system such as the front end of a radar receiver, perhaps of the agile type, then the main passband amplifier 10, the notch filter 20 and the pass filter 28 all have to be tuned to and caused to continuously track the center frequency $f_c$ as it moves around. No specific means is shown in the drawing for accomplishing this purpose except that mechanical gang-tuning linkages G are schematically illustrated in FIG. 1. However, it is to be understood that these tuning devices need not be mechanical, but may be voltage-tuning devices such as are commercially available on the market at the present time.

It is to be understood that the pass filter 28 and/or the notch filter 20 may comprise integral parts of the wideband regulating amplifier 16, or alternatively they may comprise separate units, and that the video detectors 22 and 30 may or may not include amplification to raise the level of their filtered and detected signals to a range of peak-voltage values which can easily be compared with the adjustable threshold voltages appearing in the comparators 24 and 32. These are features of design and are not believed to involve invention in their selection when making a practical working embodiment.

Having described illustrative embodiments of my invention, I now present the following claims:

1. A system having an input for accepting a spectrum of similar-frequency signals including on-frequency desired components and off-frequency undesired components and said system being operative to pass desired signal components having favorable levels to its output and to reduce interfering signals caused by undesired components by blocking the passage of signals to its output when the levels of desired and undesired signals relative to predetermined reference levels are unfavorable, comprising:

a. main passband means coupled to said input to pass signals including desired components;

b. gate means coupled between said main passband means and said output;

c. auxiliary passband means coupled to said input to accept said desired and undesired components and deliver composite signals, said auxiliary passband means including first filter means connected to accept said composite signals and being frequency-tuned to substantially block said desired components and to pass substantially the undesired components thereof and further including second filter means connected to accept said composite signals and frequency-tuned to pass substantially the desired component and to block the undesired components thereof, and said auxiliary passband means including separately adjustable reference level comparator means respectively coupled to said filter means to receive the components passed thereby and to compare their levels with predetermined reference means, the comparator means including means for delivering control signals to said gate means to render it conductive when the desired component levels and the undesired component levels are both favorable with respect to the respective predetermined reference means and to block the gate means when any of these component levels are unfavorable with respect thereto.

2. In a system as set forth in claim 1, said filter means delivering said components at separate filter outputs; and said comparator means comprising separate signal level comparators, each having its own adjustable reference level, and said comparators being respectively coupled to said filter outputs, each comparator having an output responsive to the relative magnitude of the reference level and the component applied to that comparator; and said gate means having two control-signal inputs requiring simultaneous enabling to render the gate means conductive, one input partially enabling the gate when the undesired component level is below its comparator reference level, and the other input partially enabling the gate when the desired component exceeds its comparator reference level.

3. In a system as set forth in claim 1, said auxiliary passband means including regulating amplifier means for regulating said composite signals to a constant level to which said reference means are referred, and said amplifier means having a composite passband which is broad as compared with the main passband means.

4. In a system as set forth in claim 3, said predetermined reference means in the comparator means comprising means for establishing adjustable DC levels which are less than the peak level to which said regulating means adjusts the composite signal level, and means for comparing the instantaneous peak voltages of the components passed by the filter means with said DC levels.

5. In a system as set forth in claim 3, said first filter means in the auxiliary passband comprising a notch filter tuned to reject on-frequency components whereby its output comprises the off-frequency components of the regulated composite signal, and said comparator means including a first reference level to which the level of said off-frequency components is compared to obtain a gate control signal to block said gate means in the event that the former exceeds the latter and to partially enable the gate means when in the opposite event.

6. In a system as set forth in claim 5, said second filter means in the auxiliary passband comprising a pass filter tuned to pass on-frequency components whereby its output comprises the on-frequency components of the regulated composite signal, and said comparator means including a second reference level to which the level of said on-frequency components is compared to obtain a gate control signal to partially enable said gate means in the event that the former exceeds the latter and to block the gate means in the opposite event.

7. The method of receiving and passing to an output desired signal components of one frequency and blocking spurious components of other frequencies which are also received in a spectrum therewith including the steps of:

a. taking a portion of the received composite components and adjusting the level of said portion of the composite components to a standardized value;

b. substantially separating said adjusted composite into said components;

c. comparing the levels of the separated components with preselected reference levels whose magnitudes represent certain proportions of said standardized value to determine the levels of said components; and d. Selectively passing said received components to said output including blocking their passage whenever the desired components fall below a predetermined level or the spurious components exceed a predetermined level, and otherwise unblocking the passage to pass said components to the output.

* * * * *

UNITED STATES PATENT OFFICE
CERTIFICATE OF CORRECTION

Patent No. 3,621,401 Dated November 16, 1971

Inventor(s) Walter J. Young, Jr. et al

It is certified that error appears in the above-identified patent and that said Letters Patent are hereby corrected as shown below:

The patent as printed lists only one inventor, Walter J. Young, Jr. It is hereby corrected to include all three inventors as follows:

Walter J. Young, Jr.
Paul R. Edlich
Lewis Michnik

Signed and sealed this 23rd day of May 1972.

(SEAL)
Attest:

EDWARD M.FLETCHER,JR.
Attesting Officer

ROBERT GOTTSCHALK
Commissioner of Patents